US006361729B1

(12) United States Patent
Strover et al.

(10) Patent No.: US 6,361,729 B1
(45) Date of Patent: Mar. 26, 2002

(54) METHOD OF MANUFACTURING A SURGICAL MODEL

(75) Inventors: Sheila Margaret Strover; Ross Angus Strover, both of St. Agnes (GB)

(73) Assignee: United Surgical Services Limited, United Kingdom ( * ) Notice: Subject to any disclaimer, the term of this patent is extended or adjusted under 35 U.S.C. 154(b) by 0 days.

(21) Appl. No.: 09/297,658

(22) PCT Filed: Nov. 5, 1997

(86) PCT No.: PCT/GB97/03038

§ 371 Date: May 5, 1999

§ 102(e) Date: May 5, 1999

(87) PCT Pub. No.: WO98/20473

PCT Pub. Date: May 14, 1998

(30) Foreign Application Priority Data

Nov. 7, 1996  (GB) ............................................. 96231980
Nov. 7, 1996  (GB) ............................................. 96232004

(51) Int. Cl.⁷ ............................................... G09B 23/30
(52) U.S. Cl. ..................... 264/247; 264/250; 264/261; 264/263; 264/275; 264/277; 434/274
(58) Field of Search .................. 264/247, 250, 264/261, 263, 275, 277; 434/262, 267, 274, 275

(56) References Cited

U.S. PATENT DOCUMENTS

| 4,086,318 A | * | 4/1978 | Garasi et al. ................ 264/135 |
| 4,331,428 A | | 5/1982 | Chandler |
| 5,967,790 A | * | 10/1999 | Strover et al. ............... 434/274 |

FOREIGN PATENT DOCUMENTS

| DE | 3840473 | 6/1990 |
| GB | 2204175 | 11/1988 |
| WO | 9733263 | 9/1997 |

\* cited by examiner

Primary Examiner—Nam Nguyen
Assistant Examiner—Donald Heckenberg
(74) Attorney, Agent, or Firm—Ira S. Dorman

(57) ABSTRACT

A surgical model simulating certain aspects of the natural anatomical joint is made by first providing a male mould conforming externally to the general anatomy of an internal cavity of the joint. A coating of resilient impermeable penetrable material is applied over the male mould. The coating is removed from the male mould to form an open capsule. A closure is provided for the capsule attached to the open capsule so as to form an impermeable penetrable capsule, the capsule conforming internally to the general anatomy of the internal cavity of the joint and containing simulated joint components. The capsule is arranged within a mould, the mould being at least partly lined with a penetrable outer skin material, and the capsule is embedded in a penetrable packing material. Finally, the model is removed from the mould.

23 Claims, 4 Drawing Sheets

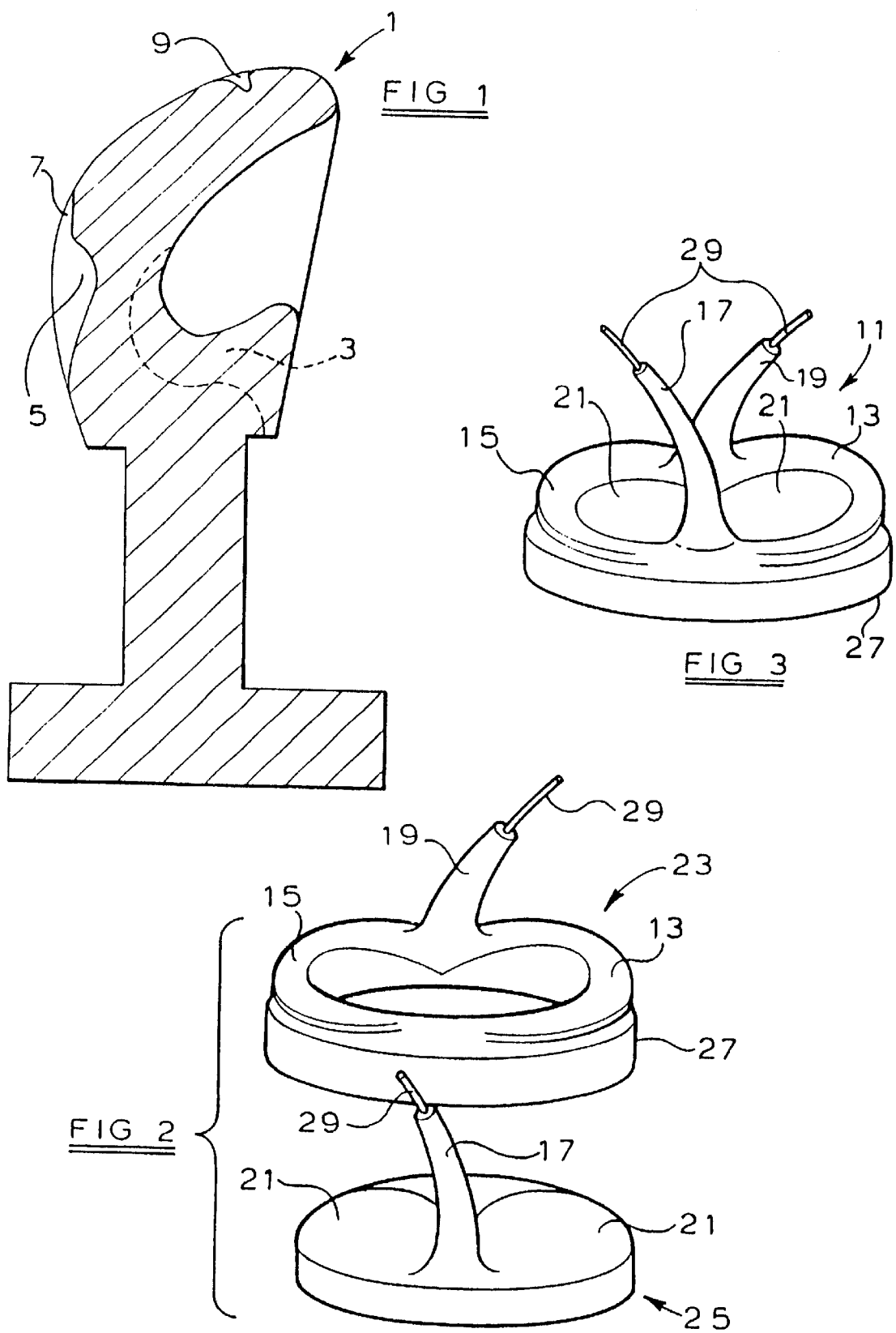

METHOD OF MANUFACTURING A SURGICAL MODEL

BACKGROUND OF THE INVENTION

The present invention relates to a method of manufacturing a surgical model and more particularly, but not exclusively, relates to a method of manufacturing a surgical model which simulates certain aspects of a natural anatomical joint and which is capable of being prepared with realistic simulation of certain pathologies for demonstrating and/or practising appropriate surgical techniques by arthroscopy in a realistic manner using endoscopic surgical instruments.

Surgical models for demonstrating and/or practising surgical techniques by arthroscopy are generally unrealistic. For example, existing models are often anatomically incorrect, at least insofar as the properties of the materials used for the models are concerned, are generally provided with pre-formed portals and are generally not watertight. These shortcomings give rise to significant difficulties in the training of surgeons in arthroscopic techniques in which, for example, the positioning of the portals and irrigation of the joint are particularly important.

SUMMARY OF THE INVENTION

It is therefore an object of the present invention to provide a method of manufacturing a surgical model which eliminates or at least reduces these deficiencies of prior art models.

According to the present invention there is provided a method of manufacturing a surgical model simulating certain aspects of the natural anatomical joint, the method comprising the steps of: providing a male mould conforming externally to the general anatomy of an internal cavity of the joint; applying a coating of resilient impermeable penetrable material over the male mould; removing the coating from the male mould to form an open capsule; providing a closure for the capsule and attaching the closure to the open capsule so as to form an impermeable penetrable capsule, the capsule conforming internally to the general anatomy of the internal cavity of the joint and containing simulated joint components; arranging the capsule within a mould, the mould being at least partly lined with a penetrable outer skin material; embedding the capsule in a penetrable packing material; and removing the model from the mould.

The method may include the step of reinforcing the model, for example with a fibrous, mesh or gauze material. The reinforcement may be applied to the coating of resilient material and/or the skin.

The capsule may be filled with fluid such as water or saline, to simulate synovial fluid, which fluid may be pressurised.

The skin of the model and the capsule may be formed of an elastomeric compound such as rubber, for example silicone rubber, or a colloid material, for example based on gelatine.

The packing material may comprise light discrete particulate material such as polystyrene beads or may comprise a moulded light material, for example expanded polystyrene or polyurethane, or may comprise the same material as the skin and/or the capsule.

The closure for the capsule may comprise an articular surface of a bone forming part of the joint.

The method may include the step of passing an elongate member simulating a ligament and/or a tendon through at least a part of the capsule, either before or after the closure is inserted. The elongate member may then be secured externally of the capsule. The elongate member may comprise an elastomeric material. The elongate member may incorporate a flexible elongate element extending from at least one end thereof. The flexible elongate element may extend through the elongate member in the axial direction thereof. The flexible elongate element may comprise string or a like filamentary material.

The joint comprising the surgical model may be in the form of a knee structure, the knee structure comprising femoral condyles with a femoral notch therebetween, medial and lateral menisci, anterior and posterior cruciate ligaments and tibial articular surfaces. The mould for receiving the capsule may be an inverted knee-shape. The method may include the step of arranging within the mould a simulated patellar complex positioned intermediate the capsule and the skin. The patellar complex may incorporate a simulated patella, a simulated patellar tendon and may additionally incorporate a simulated tibial tubercle. The patellar complex may be made of a material harder than the skin and the capsule, for example a harder plastics material such as polyurethane. The patellar complex may allow removal of a part thereof to simulate a bone-tendon-bone graft. The patellar complex may additionally be embedded in the penetrable packing material. The male mould may incorporate recesses conforming to the anatomy of the femoral condyles with the femoral notch therebetween. The male mould may additionally incorporate recesses conforming to one or more of the anatomy of the articular surface of the patella, plicae, the pes anserinus tendon and the fat pad. The coating material may be applied separately to the recesses of the male mould.

The closure for the capsule may comprise an assembly simulating the anatomical features of the medial and lateral menisci, the anterior and posterior cruciate ligaments and the tibial articular surfaces. The assembly may comprise first and second sub-assemblies with the medial and lateral menisci being formed as a first sub-assembly together with the posterior cruciate ligament, and with the tibial articular surfaces being formed as a second sub-assembly together with the anterior cruciate ligament. The sub-assemblies may be interconnected by means of a skirt provided on the first sub-assembly and adapted to extend around the periphery of the second sub-assembly. Additionally, the second sub-assembly may be provided with a recess which receives the posterior cruciate ligament of the first sub-assembly.

The method may include the step of securing the free ends of the posterior and anterior cruciate ligaments within the femoral notch. This may be effected by providing an elongate member extending from the free end of each ligament and by passing the elongate member of one ligament through opposite sides of the femoral notch. The elongate member may then be secured externally of the capsule.

As an alternative, the joint comprising the surgical model may be in the form of a shoulder structure, the shoulder structure comprising a humeral head, an articular surface of the glenoid process, a glenoid labrum and a biceps tendon. The method may include the step of arranging within the mould a simulated scapulo-clavicular complex positioned intermediate at least a part of the capsule and the skin. The scapulo-clavicular complex may incorporate a portion of a simulated clavicle and a portion of a simulated scapula, for example including the acromial and coracoid processes. The scapulo-clavicular complex may be made of a harder material than the skin and the capsule, for example a harder plastics material such as polyurethane.

The male mould may incorporate recesses conforming to the anatomy of the humeral head and the glenoid labrum. The male mould may additionally incorporate recesses conforming to the anatomy of one or more of the lateral end of the clavicle and/or the lateral portion of the acromial process and/or one or more of the claviculo-acromial ligament, the coraco-acromial ligament, the superior and/or middle gleno-humeral ligaments, all or part of the inferior gleno-humeral complex such as one or more of the anterior, axillary and posterior bands, the tendons of the supra spinatus, the infra spinatus and the teres minor muscles may also be formed in the capsule wall, together, optionally, with the sub-scapularis tendon.

The closure for the capsule may simulate the anatomical features of the glenoid process.

The method may include the step of securing a simulated biceps tendon in or externally on opposing walls of the capsule, for example behind the humeral head and above the glenoid labrum.

The capsule may be manufactured as two or more capsule structures. Adjacent capsule structures may be interconnected by means of an aperture.

According to another aspect of the invention there is provided a surgical model in the form of a shoulder structure simulating certain aspects of the natural anatomical joint, the model comprising a penetrable outer skin, an impermeable penetrable capsule within the model, and penetrable packing material around the capsule, wherein the capsule conforms internally to the general anatomy of the internal cavity of the shoulder and contains simulated joint components comprising a humeral head, an articular surface of the glenoid process, a glenoid labrum and a biceps tendon.

The model may be provided with a generally flat base or may be configured to be received in a cradle, which cradle is provided with a generally flat base. The base of the model or the cradle may be formed with at least one recess for engaging with a complementary protrusion formed on a receiving tray.

The model may include a simulated scapulo-clavicular complex intermediate the capsule and the skin. Penetrable packing material may be provided around at least a part of the simulated scapulo-clavicular complex. The scapulo-clavicular complex may incorporate a portion of a simulated clavicle and a portion of a simulated scapula, for example including the acromial and coracoid processes. The scapulo-clavicular complex may be made of a harder material than the skin and the capsule, for example a harder plastics material such as polyurethane.

The components simulating the humeral head and the glenoid labrum may be formed integrally with the capsule, for example they may be formed in the capsule wall.

Components simulating the lateral end of the clavicle and/or the lateral portion of the acromial process may be formed in the capsule wall. Components simulating one or more of the claviculo-acromial ligament, the coraco-acromial ligament, the superior and/or middle gleno-humeral ligaments, all or part of the inferior gleno-humeral complex such as one or more of the anterior, axillary and posterior bands, the tendons of the supra spinatus, the infra spinatus and the teres minor muscles may also be formed in the capsule wall, together, optionally, with the sub-scapularis tendon.

The component simulating the glenoid process may be formed as a separate assembly to the remainder of the capsule. For example, the component may be secured in an aperture formed in the capsule wall.

The biceps tendon may be secured in or externally on opposing walls of the capsule behind the humeral head and above the glenoid labrum.

The capsule may comprise two capsule structures. The capsule structures may be interconnected by means of an aperture which may simulate a tear in the tissue intermediate the two capsule structures.

Various pathologies can be simulated. For example, capsular tears and rotator cuff tears can be formed, such as the aperture intermediate the capsule structures. Alternative tears can allow the surgeon to practise suturing or stapling, or even stapling part of the rotator cuff to a bone in addition to suturing. Other pathologies may be simulated for example by cutting the glenoid labrum to simulate a Bankart lesion.

The capsule may be filled with fluid such as water or saline, to simulate synovial fluid, which fluid may be pressurised, to simulate the conditions under which the appropriate arthroscopic technique would usually be conducted.

The skin of the model and the capsule may be formed of an elastomeric material such as rubber, for example silicone rubber, or a colloid material, for example based on gelatine.

The packing material may comprise light discrete particulate material such as polystyrene beads or may comprise a moulded light material, for example expanded polystyrene or polyurethane, or may comprise the same material as the skin and/or the capsule.

The capsule and/or the skin may incorporate, or may be at least partly surrounded internally of the model by, a reinforcing material, such as a fibrous, mesh or gauze material.

For a better understanding of the present invention and to show more clearly how it may be carried into effect reference will now be made, by way of example, to the accompanying drawings in which:

BRIEF DESCRIPTION OF THE DRAWINGS

FIG. 1 is a cross-sectional view of a male mould for use in the manufacture of a capsule for use in a model in the form of a knee joint made by the method according to the present invention;

FIG. 2 is an exploded perspective view of an assembly for a closure for use with a capsule manufactured using the male mould of FIG. 1;

FIG. 3 is a perspective view of a closure incorporating the assembly of FIG. 2;

DETAILED DESCRIPTION OF THE INVENTION

Figure 4:
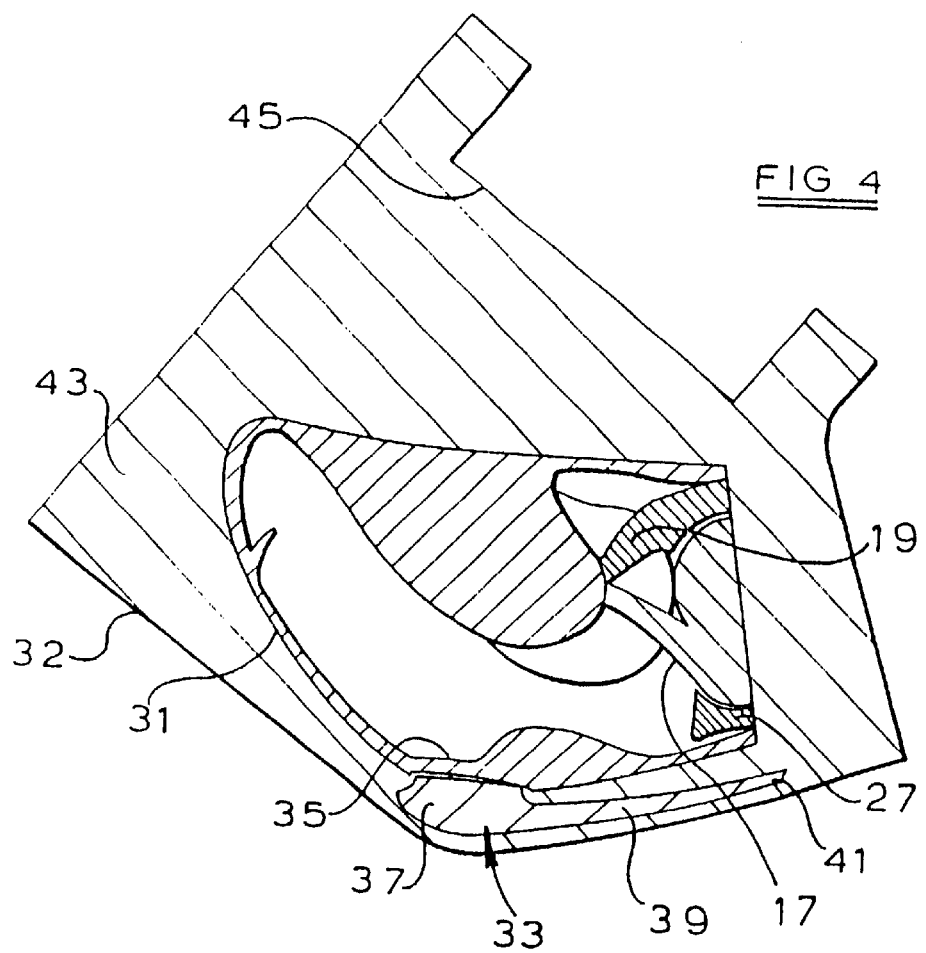
FIG. 4 is a cross-sectional view of one embodiment of a knee joint made by the method according to the present invention.

The model knee joint is manufactured by first providing a male mould 1 corresponding to the configuration of the internal cavity of the knee when expanded by fluid under pressure. The male mould 1 incorporates recesses 3 conforming to the anatomy of the femoral condyles together with recesses 5, 7 and 9, respectively, conforming to the anatomy of the fat pad, together with the articular surface of the patella, plicae and the pes anserinus tendon (not shown). The mould 1 is supported at the lower end thereof.

Elastomeric moulding material is applied in an appropriate colour and in a thin layer to the recesses of the male mould 1. The moulding material may be a rubber, for example silicone rubber, or a colloid material, such as one based on gelatine. Silicone rubber material has the advantage of a long shelf-life, but it is not bio-degradable. Colloid material has the advantage that it is bio-degradable. Both silicone rubber and colloid material enable the surgeon to practise techniques in a realistic manner.

Thus, when a silicone rubber is used, the recess corresponding to the fat pad may be coated with silicone rubber coloured yellow, while the recesses corresponding to the articular surface of the patella, plicae and the pes anserinus tendon may be coated with silicone rubber coloured white. If desired, fibrous material coloured red may be applied to the surface of the mould to simulate blood vessels in the internal surface of the coating. Additionally, the region of the mould corresponding to the femoral condyles may also be coated with silicone rubber coloured white. The remainder of the mould may then be coated with suitably coloured silicone rubber. If desired, the recesses in the surface of the coating, arising from the recesses of the mould, may be filled with silicone rubber.

The moulding material is elastomeric and, when dry, can be removed from the male mould 1 simply by peeling the silicone rubber or colloid material away from the mould, giving rise to a "pouch" which is open at its lower end, but which incorporates therewithin the anatomical features of inter alia the femoral condyles and the supra-patellar pouch.

The thickness of the coating may be selected such that the coating is generally self-supporting when removed from the male mould 1. If desired, the coating may be reinforced with a fibrous, mesh or gauze material which may be incorporated into the coating or may be applied as part of a further coating either to the pouch or, at a later stage, to the entire capsule.

The configuration of the pouch is clear from FIGS. 1 and 4 as will be explained in more detail hereinafter.

The lower end of the pouch is closed by a closure assembly 11 shown in FIGS. 2 and 3. The closure assembly 11 reproduces the anatomical features of the medial and lateral menisci 13 and 15 respectively, anterior and posterior cruciate ligaments 17 and 19 respectively and the. tibial articular surfaces 21. This assembly is shown in exploded form in FIG. 2 and, in assembled form, in FIG. 3.

The assembly 11 is in two parts, an upper sub-assembly 23 and a lower sub-assembly 25. The upper sub-assembly 23 reproduces the medial and lateral menisci 13 and 15 respectively, together with the posterior cruciate ligament 19, while the lower sub-assembly 25 reproduces the tibial articular surfaces 21, together with the anterior cruciate ligament 17. The anterior cruciate ligament 17 of the lower sub-assembly 25 is received in a recess formed between the menisci of the upper sub-assembly 23 and the menisci are provided with a depending peripheral skirt 27 which extends around the lower sub-assembly so that the two sub-assemblies are locked together to form the closure assembly 11. It should be noted that the upper sub-assembly could alternatively. incorporate the anterior cruciate ligament, with the lower sub-assembly incorporating the posterior cruciate ligament. Strings 29 or the like are attached by any suitable adhesive to the free ends of the cruciate ligaments 17, 19 for reasons that will be explained in more detail hereinafter. It will be noted that it is not essential for the strings 29 to be secured to the free ends of the cruciate ligaments and it may be possible to provide strings passing within the ligaments. However, it is desirable for the ligaments to retain their resilient properties.

The closure assembly 11 is then inserted into the open lower end of the pouch and the strings 29 are each threaded on a needle (not shown) which is inserted through the wall of the pouch, one at each side of the condylar notch to simulate the anatomical arrangement of the ligaments. In this way, the proximal ends of the ligaments are secured within the femoral notch in an anatomically realistic manner, for example in recesses provided therein.

The strings 29 are secured outside the pouch, for example by means of a knot and/or with an adhesive, silicone rubber or colloid material, and any excess string is removed. The closure assembly 11 is then secured in position with an adhesive, silicone rubber, colloid material or the like to form a watertight capsule 31 which conforms internally to the anatomy of the internal cavity of the knee when expanded by fluid under pressure. As noted above, the capsule may be reinforced with a fibrous, mesh or gauze material which may be applied as part of a coating to the entire capsule.

In a separate stage (not illustrated) a mould, conforming to the external shape of the model knee joint of FIG. 4 is provided with the knee inverted and is coated internally with a material to form a skin 32 for the model. As an alternative to coating, a separate skin 32 may be applied to the internal surface of the mould. For example, the material may comprise a silicone rubber or colloid material which is ideally coloured to simulate skin. If desired, the skin may be reinforced with a fibrous material. A patellar complex 33 is then positioned within the mould in the appropriate position and the capsule 31 is positioned above the patellar complex.

The patellar complex 33 incorporates the patella 37 (other than the articular surface 35 thereof which has previously been formed as part of the capsule), the patellar tendon 39 and a tibial tubercle 41. The patellar complex 33 is made of a harder material than the material of the skin, for example a harder plastics material such as polyurethane, in order to give a realistic impression to the surgeon when examining (palpating) the model prior to commencing an operation.

With the patellar articular surface appropriately positioned relative to the patella, the patellar complex 33 can be secured in position, if desired, for example with an adhesive, silicone rubber or colloid material. Packing material 43 may be positioned around the capsule and the upper part of the mould closed with silicone rubber or colloid material.

The packing material 43 may be a lightweight material such as polystyrene beads or expanded polystyrene or polyurethane block, but may alternatively be the same material as that of the skin 32, i.e. silicone rubber or colloid material.

Alternatively, the mould may be filled with silicone rubber or colloid material.

A recess 45 may be formed in the base by any suitable means, such as by moulding the recess into the base or by subsequently removing material to form the recess.

The capsule 31 may be filled with a fluid such as water or saline, to simulate synovial fluid, and the fluid may be pressurised to simulate the conditions under which the appropriate arthroscopic technique would usually be conducted.

Various pathologies can be simulated. For example, material may be deposited in para-condylar gutters which extend below and to the side of the menisci to simulate a pathological loose body. Other pathologies may be simulated by cutting a joint surface to leave a loose chondral flap, abrading a joint surface to leave exposed bone, a ligament and/or one or more menisci may be torn to simulate injury. Additionally, the patellar complex may be made in a number of components to allow removal of part of the complex to simulate a bone-tendon-bone graft.

Thus the model is primarily concerned with the internal shape of the knee joint and not with other anatomical features, such as the shafts of bones, which are not visible through an arthroscope. However, the internal anatomy of the capsule is very realistic. The capsule, and the model, are watertight and pressure resistant and therefore allow realistic simulation of true operating conditions. Additionally, the model permits a surgeon to practise other procedures such as suturing of a meniscus, while the presence of the pes anserinus tendon gives the surgeon additional indications as to the location of the instruments within the model.

Figure 5:
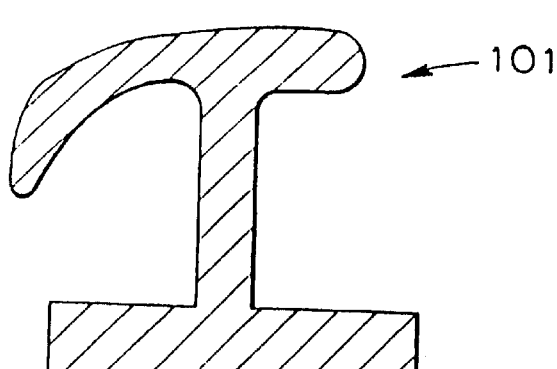
FIG. 5 is a cross-sectional view of a first male mould for use in the manufacture of a first pouch part for use in a model in the form of a shoulder joint made by the method according to the present invention.
Figure 6:
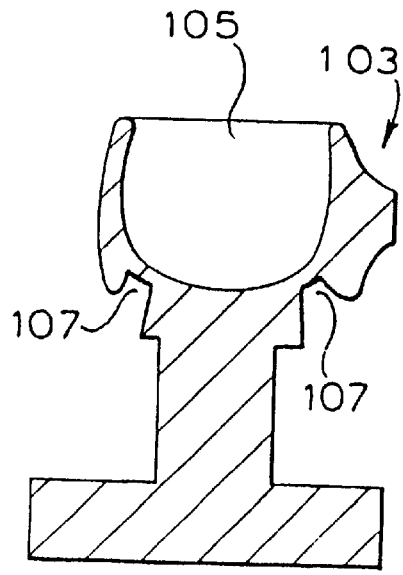
FIG. 6 is a cross-sectional view of a second male mould for use in the manufacture of a second pouch part for use in a model in the form of a shoulder joint made by the method according to the present invention.

The model shoulder joint is manufactured by providing two male moulds 101 and 103 as shown in FIGS. 5 and 6, although a single male mould could be employed if desired. The male moulds 101 and 103 correspond to the configuration of the internal cavities of the shoulder when expanded by fluid under pressure. The male mould 101 simulates the sub-acromial space (or bursa) within the shoulder and the male mould 103 simulates the glenohumeral space.

The male mould 101 incorporates recesses (not shown) in the upper surface thereof conforming to the anatomy of the lateral end of the clavicle and to the lateral portion of the acromial process of the scapula. Recesses are also formed conforming to the anatomy of the claviculo-acromial ligament and the coraco-acromial ligament. The mould 101 is supported at the lower end thereof.

The male mould 103 incorporates a recess 105 in the upper part thereof conforming to the anatomy of the humeral head and a generally oval recess 107 in the lower part thereof conforming to the anatomy of the glenoid labrum.

The exterior surface of the male mould 103 is formed with a number of elongate protrusions (not shown) representing the several ligaments that span the joint and make up the support for the shoulder. The various ligaments envelope the humeral head and include the superior and middle glenohumeral ligaments which extend generally in a series of arcs from the anterior surface of the glenoid fossa of the glenoid process to the anterior aspect of the humeral head, the inferior gleno-humeral complex which extends in a hammock-like structure around the left-hand side of the mould 103 (as shown in the figure) and cradles the humeral head and comprises. the anterior, axillary and posterior bands, and a cuff of musculo-tendinous structures known as the rotator cuff, including the tendons of the supra spinatus, infra spinatus and teres minor muscles which extend from the posterior side of the glenoid fossa to the posterior aspect of the humeral head. As many of these ligaments as are desired may be defined as recesses on the external surface of the mould 103. Additionally, the sub-scapularis tendon may be defined intermediate the superior and middle glenohumeral ligaments.

Elastomeric moulding material is applied in an appropriate colour and in a thin layer to the recesses of each of the male moulds 101 and 103. As with the model knee joint, the moulding material may be a rubber, for example silicone rubber, or a colloid material, such as one based on gelatine.

Thus, when a silicone rubber is used, the recesses in the male moulds 101 and 103 corresponding to the clavicle, the acromial process, the coracoid process and the humeral head may be coated with silicone rubber coloured white, while the recesses corresponding to the various ligaments may be coated with silicone rubber coloured white or any other suitable colour. If desired, fibrous material coloured red may be applied to the surface of one or more of the moulds to simulate blood vessels in the internal surface of the coating. The remainder of each of the moulds may then be coated with suitably coloured silicone rubber. If desired, the recesses in the surface of the coating, arising from the recesses of the moulds, may be filled with silicone rubber.

The moulding material is elastomeric and, when dry, can be removed from each of the male moulds 101 and 103 simply by peeling the silicone rubber or colloid material away from the respective mould giving rise to a "pouch" which is open at its side, but which incorporates therewithin the desired anatomical features.

The thickness of the coating may be selected such that the coating is generally self-supporting when removed from the mould. If desired, the coating may be reinforced with a fibrous, mesh or gauze material which may be incorporated into the coating or may be applied as part of a further coating either to the pouch or, at a later stage, to the entire capsule.

In the illustration of the method, the pouch is made in two parts 109 and 111 which are subsequently interconnected by way of an aperture 113 formed in each part, the two parts being secured together with-the aid of silicone rubber, colloid material or other suitable adhesive.

Figure 8:
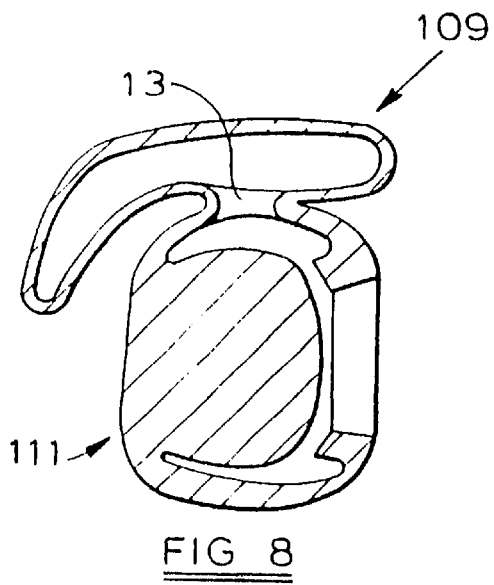
FIG. 8 is a cross-sectional view of a pouch incorporating pouch parts made with the male moulds of FIGS. 5 and 6.

After they have been interconnected, the two pouch parts 109 and 111 communicate with one another by way of the aperture 113 which simulates a tear in the tissue between the two pouch parts. The combined pouch is shown in cross-section in FIG. 8.

As an alternative, the pouch may be made in a single component.

A component 115, for example of silicone rubber or colloid material, with or without a string passing therethrough, representing the biceps tendon is threaded through the side walls of the pouch part 111 with the aid of a needle (not shown) so as to pass over the humeral head and is secured to the exterior of the pouch, for example with silicone rubber, colloid material or any suitable adhesive. The component 115 representing the biceps tendon is shown in FIG. 9 as extending across the superior surface of the humeral head and secured in opposing walls of the pouch behind the humeral head and above the glenoid labrum.

Figure 7:
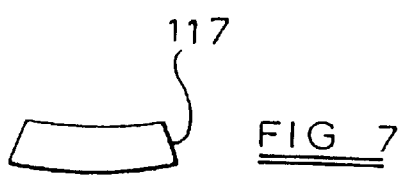
FIG. 7 is a side elevational view of a closure for use with a pouch part manufactured using the male mould of FIG. 6.
Figure 9:
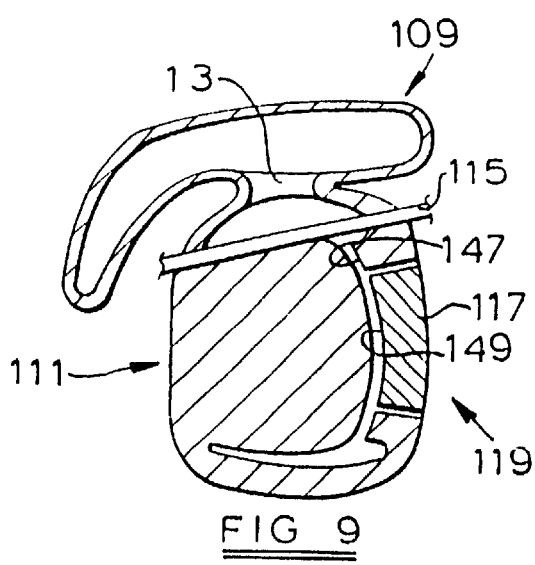
FIG. 9 is a cross-sectional view of a capsule incorporating the pouch of FIG. 8 and the closure of FIG. 7.

The pouch is closed by a closure member 117 as shown in FIGS. 7 and 9. The closure member 117 reproduces the anatomical features of the articular surface of the glenoid process. The closure member 117 is secured in position with an adhesive, silicone rubber, colloid material or the like to form a watertight capsule 119 as shown in FIG. 9, which watertight capsule conforms internally to two of the internal cavities of the shoulder when expanded by fluid under pressure. As noted above, the capsule. 119 may be reinforced with a fibrous, mesh or gauze material which may be applied as part of a coating to the entire capsule.

Various pathologies can be simulated. For example, capsular tears and rotator cuff tears, such as the aperture shown between the capsule components. Alternative tears can allow the surgeon to practise suturing or stapling, or even stapling part of the rotator cuff to a bone in addition to suturing. Other pathologies may be simulated for example by cutting the glenoid labrum to simulate a Bankart lesion.

The capsule 119 may be filled with a fluid such as water or saline, to simulate synovial fluid, and the fluid may be pressurised to simulate the conditions under which the appropriate arthroscopic technique would usually be conducted.

Figure 10:
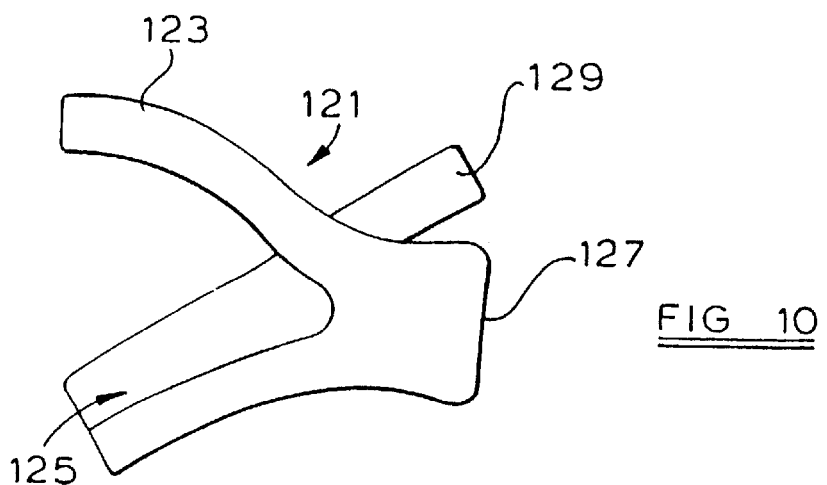
FIGS. 10 and 11 illustrate a simulated bone structure in the form of a scapulo-clavicular complex.
Figure 11:
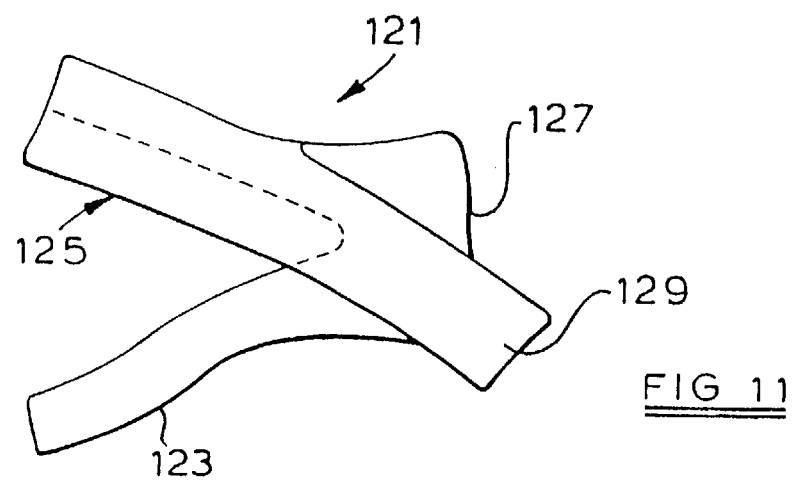

In a separate stage, a scapulo-clavicular complex 121 which simulates part of the bone structure of the shoulder is moulded in the form shown in FIGS. 10 and 11. The scapulo-clavicular complex 121 comprises the anatomy of part of the clavicle 123 integrally formed with part of the scapula 125, in particular the acromial process 127, with the sub-acromial space therebeneath, and the coracoid process 129. The scapulo-clavicular complex 121 is made of a harder material than the capsule and may be made, for example a harder plastics material such as polyurethane, in order to give a realistic impression to the surgeon when examining (palpating) the model prior to commencing an operation.

Part of the capsule 119 is positioned intermediate the scapulo-clavicular complex 121 with the clavicular protrusion and the acromial protrusion within the capsule being positioned adjacent the corresponding components of the scapulo-clavicular complex. In this way, the scapulo-clavicular complex 121 provides a degree of support for the capsule 119. However, if desired, the scapulo-clavicular complex 121 can be extended to provide additional support for the capsule 119.

Figure 12:
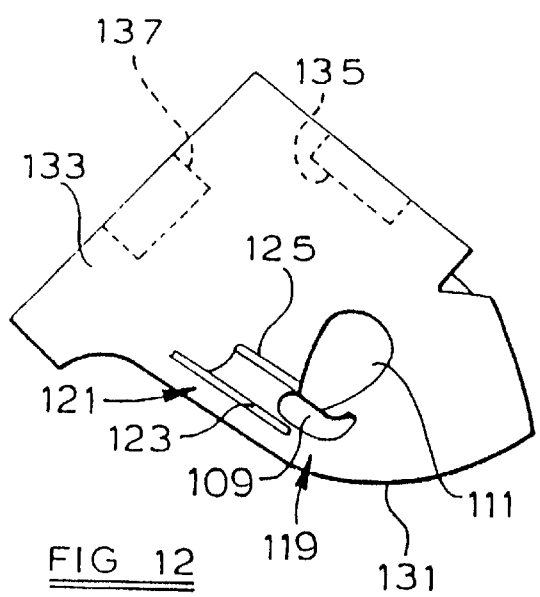
FIG. 12 is a cross-sectional view of one embodiment of a shoulder joint made by the method according to the present invention.

In a further separate stage a mould, conforming to the external shape of the model shoulder joint of FIG. 12 is provided with the shoulder inverted and is coated internally with a material to form a skin 131 for the model. As an alternative to coating, a separate skin 131 may be applied to the internal surface of the mould. For example, the material may comprise a silicone rubber or colloid material which ideally is coloured to simulate skin. If desired, the skin may be reinforced with a fibrous material. The capsule 119, positioned within the scapulo-clavicular complex 121 in the required orientation, is located within the mould in the appropriate position close to the skin surface to simulate the anatomical position of the bones and secured in position, if desired, for example with an adhesive, silicone rubber or colloid material. Packing material 133 may be positioned around the capsule 119 and the upper part of the mould closed with silicone rubber or colloid material. Alternatively, the mould may be filled with silicone rubber or colloid material. Recesses 135 and 137 may be formed in the model by any suitable means, such as by moulding the recess into the base or by subsequently removing material to form the recess.

The packing material 133 may be a lightweight material such as polystyrene beads or expanded polystyrene or polyurethane block, but may alternatively be the same material as that of the skin, i.e. silicone rubber or colloid material.

The resulting model resembles in external appearance a right human shoulder joint with the arm abducted 45° from the patient's side and 45° forward. The model has two generally flat bases, either of which can be positioned in use on a tray (not shown), with the recess 135 or 137 engaging a complementary protrusion provided on the tray.

Recess 135 allows simulation of a semi-reclining or "beach-chair" position, while recess 137 allows simulation of a patient lying on his side.

As noted previously, the watertight capsule 119 comprises two parts, or capsule structures, 109 and 111, one part 109 being positioned intermediate the scapulo-clavicular complex 121. The capsule structure 109 simulates the sub-acromial space (or bursa) within the shoulder and the capsule structure 111 simulates the gleno-humeral space.

Figure 13:
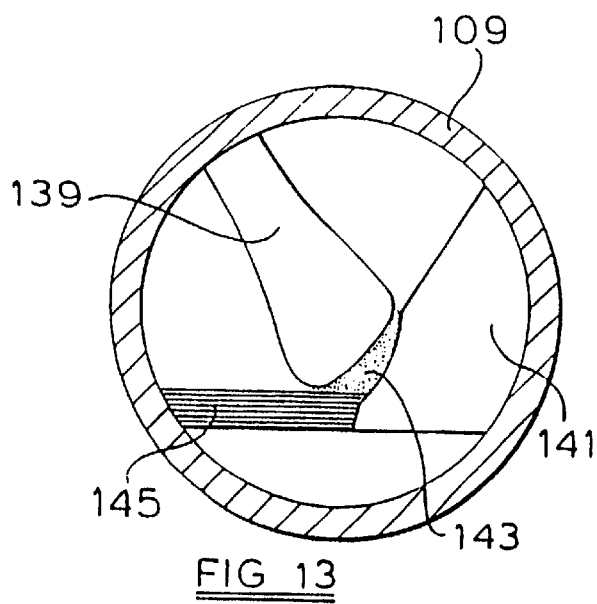
FIG. 13 is a cross-sectional view of part of the capsule shown in FIG. 9.

The upper internal surface (or roof) of the capsule structure 109 is shown in more detail in FIG. 13. The upper internal surface is formed with a clavicular protrusion 139 conforming to the lateral end of the clavicle and with an acromial protrusion 141 conforming to the lateral portion of the acromial process of the scapula. Protrusions are also formed conforming to the anatomy of the claviculo-acromial ligament 143 and the coraco-acromial ligament 145.

Figure 14:
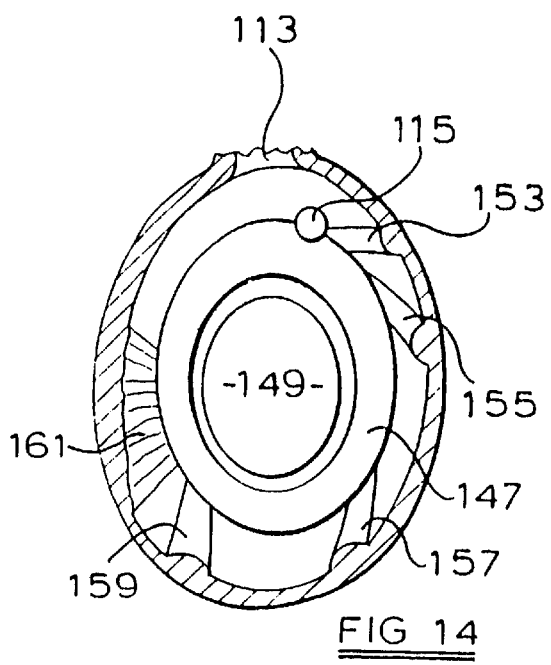
FIG. 14 is a cross-sectional view of another part of the capsule shown in FIG. 9.
Figure 15:
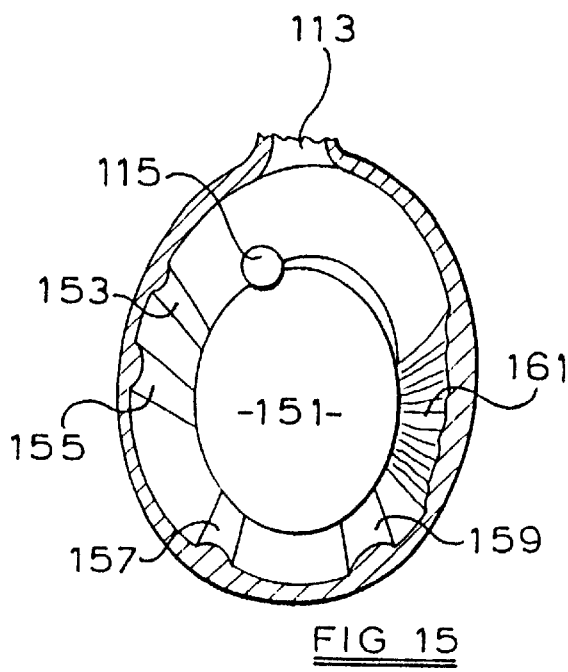
FIG. 15 is a cross-sectional view of a further part of the capsule shown in FIG. 9.

The capsule structure 111 is shown in more detail in FIGS. 14 and 15. FIG. 14 is taken in the direction looking to the right in FIG. 9, while FIG. 15 is taken in the direction looking left in FIG. 9. As can be seen from FIGS. 9 and 14, the inner surface of the capsule is formed with a generally oval protrusion 147 representing the glenoid labrum having arranged therewithin a protrusion 149 representing the articular surface of the glenoid process.

As can be seen from FIGS. 9 and 15, the capsule structure 111 is formed with an internal protrusion 151 conforming to the anatomy of the humeral head, there being a space around the sides of the protrusion.

The internal surface of the capsule structure 111 is formed with a number of elongate protrusions representing the several ligaments that span the joint and make up the support for the shoulder. The various ligaments envelope the humeral head 151 and include the superior and middle gleno-humeral ligaments which extend generally in a series of arcs from the anterior surface of the glenoid fossa of the glenoid process as shown in FIG. 14 to the anterior aspect of the humeral head as shown in FIG. 15, the inferior gleno-humeral complex which extends in a hammock-like structure around the lower part of the capsule structure 111 and cradles the humeral head and comprises the anterior, axillary and posterior bands, and the rotator cuff, including the tendons of the supra spinatus, infra spinatus and teres minor muscles which extend from the posterior side of the glenoid fossa to the posterior aspect of the humeral head as shown in FIG. 14. As many of these ligaments as are desired may be defined as ridges on the internal surface of the capsule structure 111. Additionally, the sub-scapularis tendon may be defined intermediate the superior and middle gleno-humeral ligaments. FIGS. 14 and 15 show in particular the superior and middle gleno-humeral ligaments 153 and 155, respectively, the anterior and posterior bands 157 and 159, respectively of the inferior gleno-humeral ligament complex, and the infra-spinatus 161.

Thus the model is primarily concerned with the internal shape of the shoulder joint and not with other anatomical features, such as the shafts of bones, which are not visible through an arthroscope. However, the internal anatomy of the capsule is very realistic. The capsule, and the model, are watertight and pressure resistant and therefore allow realistic simulation of true operating conditions. Additionally, the model permits a surgeon to practise other procedures such as suturing of the glenoid labrum.

What is claimed is:

1. A method of manufacturing a surgical model simulating certain aspects a natural anatomical joint, the method comprising the steps of: providing a male mould (1, 101, 103) conforming externally to the general anatomy of an internal cavity of the joint; applying a coating of resilient impermeable penetrable material over the male mould (1, 101, 103); removing the coating from the male mould to form an open capsule; providing a closure (11, 117) for the capsule and attaching the closure to the open capsule so as to form an impermeable penetrable capsule (31, 119), the capsule conforming internally to the general anatomy of the internal cavity of the joint and containing simulated joint components; arranging the capsule with a second mould, the second mould being at least partly lined with a penetrable outer skin material (32, 131); embedding the capsule in a penetrable packing material (43, 133); and removing the surgical model from the second mould.

2. A method according to claim 1 and including the step of reinforcing the model.

3. A method according to claim 2, wherein the reinforcing step comprises applying reinforcement to the coating of resilient material.

4. A method according to claim 1, wherein the capsule (31, 119) is filled with fluid to simulate synovial fluid.

5. A method according to claim 1, wherein the skin (32, 131) of the model and the capsule (31, 119) are formed of a material selected from the group consisting of an elastomeric compound and a colloid material.

6. A method according to claim 1, wherein the packing material (43, 133) is selected from the group consisting of light, discrete particulate material, a moulded light material, the same material as the skin (32, 131), and the same material as the capsule (31, 119).

7. A method according to claim 1, wherein the closure (11, 117) for the capsule (31, 119) comprises an articular surface (21, 149) of a bone forming part of the joint.

8. A method according to claim 1, including the further step of passing an elongate member (17, 19, 115) simulating at least one of a ligament and a tendon through at least a part of the capsule (31, 119).

9. A method according to claim 8, wherein the elongate member (17, 19, 115) is secured externally of the capsule (31, 119).

10. A method according to claim 8, wherein the elongate member (17, 19, 115) comprises an elastomeric material.

11. A method according to claim 8, wherein the elongate member (17, 19) incorporates a flexible elongate element (29) extending from at least one end thereof.

12. A method according to claim 11, wherein the flexible elongate element (29) extends through the elongate member (17, 19) in the axial direction thereof.

13. A method according to claim 11, wherein the flexible elongate element (29) is selected from the group consisting of string and a like filamentary material.

14. A method according to claim 1, wherein the capsule (119) is manufactured as at least two capsule structures (109, 111).

15. A method according to claim 14, wherein adjacent capsule structures (109, 111) are interconnected by means of an aperture (113).

16. A method according to claim 2, wherein the model is reinforced with a material selected from the group consisting of fibrous, mesh and gauze material.

17. A method according to claim 2, wherein the reinforcing step comprises applying reinforcement to the skin.

18. A method according to claim 4, wherein the fluid filling the capsule is selected from the class consisting of water and saline.

19. A method according to claim 4, wherein the fluid filling the capsule is pressurised.

20. A method according to claim 5, wherein the elastomeric compound is selected from the group consisting of rubber and silicone rubber.

21. A method according to claim 5, wherein the colloid material is based on gelatine.

22. A method according to claim 6, wherein the light, discrete particulate material comprises polystyrene beads.

23. A method according to claim 6, wherein the moulded light material is selected from the group consisting of expanded polystyrene and polyurethane.

* * * * *